April 30, 1968 V. F. DU BOIS 3,380,633
MULTIPLE CAVITY GUNPOWDER DISPENSER
Filed Jan. 16, 1967
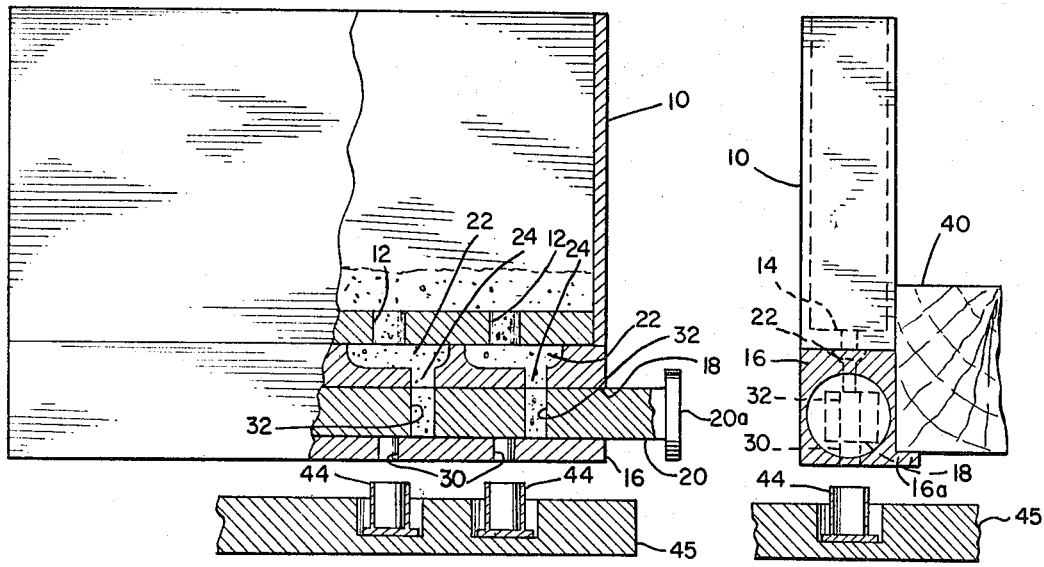
FIG. 1
FIG. 2
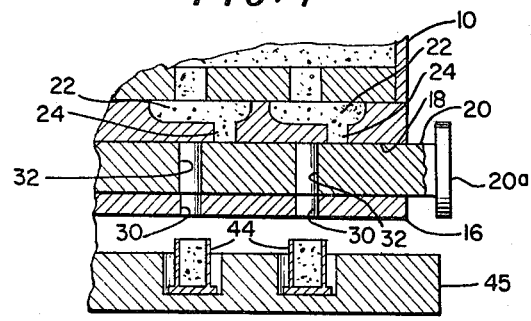
FIG. 3
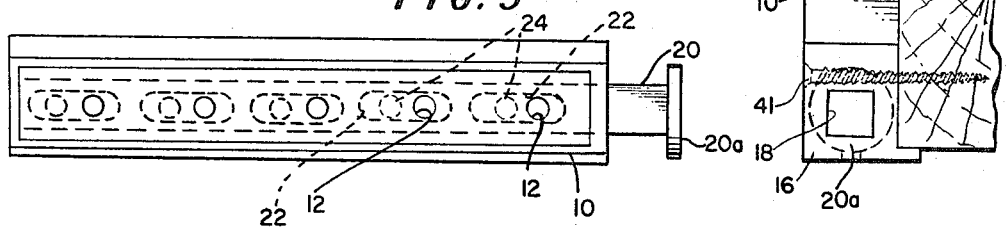
FIG. 4
FIG. 5
INVENTOR.
VERN F. DUBOIS
BY
Richard D. Law
ATTORNEY

United States Patent Office

3,380,633
Patented Apr. 30, 1968

3,380,633
MULTIPLE CAVITY GUNPOWDER DISPENSER
Vern F. Du Bois, 1190 Welsh St.,
Golden, Colo. 80401
Filed Jan. 16, 1967, Ser. No. 609,673
4 Claims. (Cl. 222—137)

ABSTRACT OF THE DISCLOSURE

A very accurate gun powder dispenser for reloading empty cartridge cases has a hopper and a series of outlet bores in the bottom thereof. A cover member over the bottom of the hopper and the outlet bores has a series of elongated shallow cavities, each in communication with a bore which is positioned adjacent one end of the cavity. At the opposite end of each cavity is a downwardly directed outlet offset from the hopper outlet so there is no direct gravity flow of powder from the hopper through the cavity. A reciprocal member is mounted in frictional engagement in the cover member and is provided with a series of precise volume measuring bores positioned to register with the cavity outlets. The bottom of the cover member has a series of dispensing outlets offset from the cavity outlets for dispensing the powder, the shallow cavities permitting filling the measuring bores with powder under the same weight of powder so that the measuring bores are filled with the same amount of powder each time of filling, regardless of the height of the powder in the hopper.

Specification

Gravity flow gunpowder dispensers for loading or reloading empty shall cases are well known; however, are single or one-at-a-time shell reloaders. Such dispensers utilize an upper hopper for a supply of powder, some sort of a measuring device for removing a small amount of powder from the hopper, and dispense it through an outlet to the shell case. For precision shooting, hand reloads are extensively used, and one critical point in such reloads is the accurate measurements of the charge of powder in the shell. Most firearm cartridges are loaded with shaped powder of relatively uniform size, for example, discs, cylinders, and the like. For uniformity of load the powder should not be packed in the measuring device, nor should there be any hangs of particles in the dispensing of powder. Further, for many applications multiple powder dispensing units are a must due to large numbers of shells to be reloaded.

According to the present invention, I have provided a highly accurate powder measuring device providing multiple cavities for simultaneously dispensing gun powder into a plurality of empty shells. The device is provided with a minimum free-fall path of the gunpowder into each measuring compartment of the device to assure exact loading of powder in the measuring compartments without packing, regardless of the amount of powder in the supply hopper, without leaving air pockets and the like. The device provides accurate multiple loading of empty shells with ease and speed, while still retaining the accuracy of each load in the load of powder in the shells, whether the hopper is full or almost empty.

Included among the objects and advantages of the present invention is a multiple cavity gunpowder dispenser for the simultaneous loading of a plurality of empty cartridge shell with a very accurate amount of gunpowder in each shell.

Another object of the invention is to provide a hopper of large capacity for a gun powder dispenser which has a minimum height free-fall path of powder into each of a series of measuring compartments for an accurate loading of gunpowder in each compartment for subsequent dispensing thereof.

A further object of the invention is to provide a gunpowder dispenser providid with a simple means for varying the quantity of gun powder dispensed from the hopper.

These and other objects and advantages of the invention may be readily ascertained by referring to the following description and appended illustrations in which:

FIG. 1 is a side elevational view, partly cut away, of a gunpowder dispensing device according to the invention;

FIG. 2 is a side elevation view thereof;

FIG. 3 is a detailed view of a dispenser for gunpowder according to the invention, in dispensing position;

FIG. 4 is a top plan view of the dispenser of FIG. 1; and

FIG. 5 is a detailed end elevational view, illustrating the mounting of the unit for operation.

In the device illustrated, a hopper 10 of generally rectangular shape, considerably longer in length than its width, is provided with a series of openings 12 in the bottom thereof spaced at uniform intervals along the bottom 14 of the hopper 10. The bottom is shown flat; however, the portions between openings could be sloped to block off blind areas, i.e., provide a funnel bottom to each outlet. Secured to the bottom 14 is a generally elongated, rectangular member 16 of substtntially the same width and length as the hopper. Extending through the member 16 is a rectangular bore 18, and in which is reciprocally mounted a plunger 20. An elongated cavity 22 is formed in the member 16 at a position to communicate with each bore 12 and in a position so that each bore 12 is adjacent one end and is directed toward the bottom of the cavity 22. An outlet cavity 24 is formed at the opposite end of and in the bottom of each cavity 22. The outlet bore 24 communicates with the rectangular bore 18. A lower outlet bore 30 extending through the lower wall of the member 16 communicates with the passage 18 but is offset from the corresponding outlet passage 24 thereabove. A plurality of measuring bores 32 are formed through the member 20, each arranged to comunicate with an outlet passage 24 in one position and a corresponding passage 26 in another position. The plunger 20 is movable from a position, shown in FIG. 1, where the measuring bore 32 is in communication with a cavity 22, to a discharge position, shown in FIG. 2, where the measuring cavity 32 is in communication with the discharge cavity 30.

For use, the member 16 has a lip 16a which may be hooked under a shelf member 40 and a series of screws 41 (FIG. 5) extended through the member 16 to hold the dispenser in position on the edge of the shelf 40. The plunger is pulled to the position shown in FIG. 1 and the hopper 10 loaded with the powder. The powder flows through the outlets 12 of the hopper into the cavities 22, through the outlets 24 and into the measuring cavities 32. The plunger is then depressed to the position of FIG. 2, where the powder is dispensed into empty cartridges 44 in a cartridge block 45. The cartridge block, which is a conventional, has a plurality of rows of cavities for the empty cartridges so that the block may be moved row by row under the outlets for simultaneously filling all the cartridges in a row by the movement of the plunger. After one row of cartridges has been filled, the plunger may be pulled sharply to the position of FIG. 1 so as to jar the powder slightly and aid in exact filling of the measuring cavity 32 in the plunger. When all the cartridges desired are filled, the cartridge block is removed and a new block with unfilled cartridges is placed in position for filling the additional cartridges. In each instance, however, the weight of the powder in the hopper is exerted onto the bottom of the cavities 22 through the outlets 12 so that the block 16 actually supports the weight of the powder in the hopper. The powder in each measuring cavity 32 only has a height from the bottom of the cavity 32 (closed by block 16) to the top of the cavity 22 and so long as there is sufficient powder to cover the outlets 12 this same weight of powder is all that is exerted on the powder in the cavity 32. Thus a very uniform volume of powder will be provided for each loading of the measuring cavities 32 regardless of the height of powder in the hopper, so long as it covers the outlets 12.

For a highly effective device, the hopper, block and plunger should be made of a synthetic resin which is relatively rigid, self-lubricating when frictionally engaged on itself, and is easily machined. Rigid epoxy resins, for example, polyesters and the like, are highly useful for this construction. Further, with the resins, rubbing movement of resin on resin is sparkless so that the device is safe from accidental explosion caused by extraneous sparks.

A plunger may be provided for each load of powder of a particular kind desired, and the plunger may be easily removed and replaced with a plunger having a different size of measuring cavity therein. Stops, not shown, are conventionally provided for plungers, and the same may be provided where desired to prevent accidental removal of the plungers. Thus, when the proper powder for the cavity is utilized, an accurate load of powder is dispensed into each empty shell, regardless of the amount of powder in the powder supply in the hopper. The device illustrated shows a rectangular shaped plunger; however, this may be round (with a groove and spline to maintain the plunger in rotational alignment) or other shape where the bore in the body 16 is of a shape to accommodate the plunger. The number of cavities in the dispenser may be any desired number, normally five is very effective, since it is not unduly bulky or unwieldly for five shells wide.

An important feature of the dispenser is that the dispensing tube is vertical for filling and dispensing, reducing the possibility of powder holdup in a dispensing bore. Furthermore, the cross-sectional dimensions of the measuring cavity to its height may be controlled by the geometry of the plunger so as to reduce the number of grains of powder subjected to a grinding action on movement of the plunger from its filling position toward its dispensing position, the grinding being accomplished at the top opening of the measuring cavity against the edge of the outlet 24 from the powder cavity 22. Grinding of the grains, of course, changes the strength and velocity of the burning and too much grinding changes the characteristics of the particular powder. By having the depth of the measuring cavity considerably greater than the cross-sectional dimensions, the number of grains which could be subjected to grinding is greatly reduced.

While the invention has been illustrated by reference to a particular embodiment, there is no intent to limit the spirit or the scope of the invention to the precise details so set forth except as defined in the following claims.

I claim:

1. An accurate, multicavity gunpowder dispensing unit comprising an elongated synthetic resin hopper having a plurality of spaced hopper outlets in the bottom thereof; a block member covering said outlets, there being a series of shallow, powder-receiving, elongated cavities in said block member, each one of which is in position to receive the powder from one said outlet adjacent an end thereof, there being an outlet from each said cavity at the opposite end thereof spaced from the hopper outlet whereby powder from the hopper drops onto the bottom of each said cavity without a direct gravity flow communication between said hopper and said cavity outlet; a reciprocal plunger member in a bore in said block member having a series of measuring ports therethrough in position to register with, and simultaneously receive powder from one of said cavity outlets, said measuring ports being of an exact volume for measuring an exact amount of powder; and a series of dispensing outlets in said block member below said cavity outlets communicating with the plunger bore but offset from said cavity outlets whereby providing a bottom seal for the measuring ports when in register with said cavity outlets and providing dispensing of powder when said measuring ports are in register with said dispensing outlets.

2. An accurate gunpowder dispenser according to claim 1 wherein said plunger is of a rectangular cross-section.

3. An accurate gunpowder dispenser according to claim 1 wherein said hopper has a length substantially longer than its width.

4. An accurate gunpowder dispenser according to claim 3 wherein said hopper is provided with five outlets and is arranged to fill five empty cases simultaneously.

References Cited

UNITED STATES PATENTS

| | | | |
|---|---|---|---|
| 581,847 | 5/1897 | Carvin | 141—237 X |
| 2,405,507 | 8/1946 | Lefren | 222—137 |

ROBERT B. REEVES, *Primary Examiner.*

H. S. LANE, *Assistant Examiner.*